May 8, 1962
E. F. DOSIE
3,032,967
EXHAUST FILTERING AND AFTER BURNER, CARBON
AND ALKALI SLUDGE REMOVAL UNITS
Filed Jan. 11, 1960
5 Sheets-Sheet 3
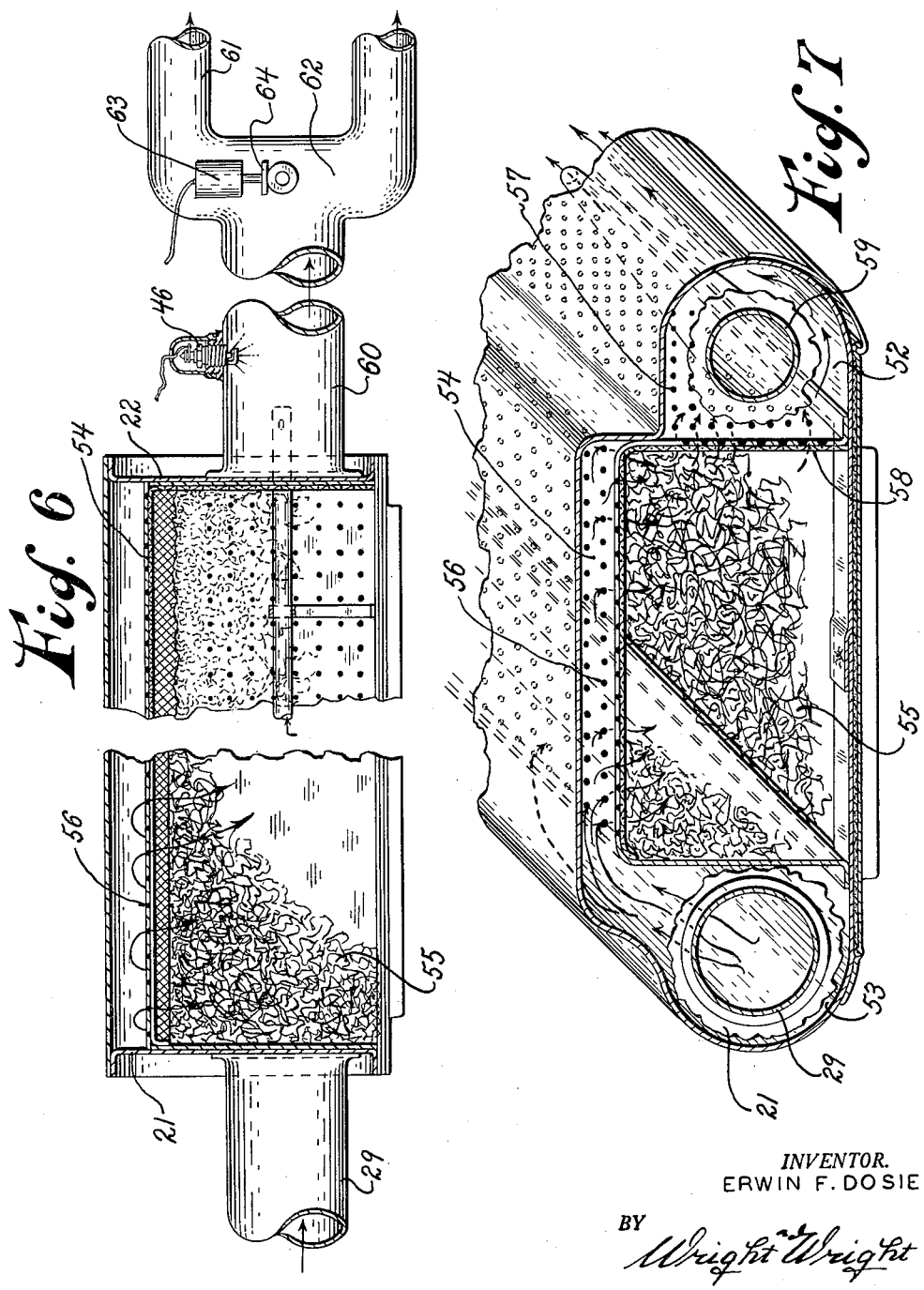
INVENTOR.
ERWIN F. DOSIE
BY
*Wright Wright*
ATTORNEYS

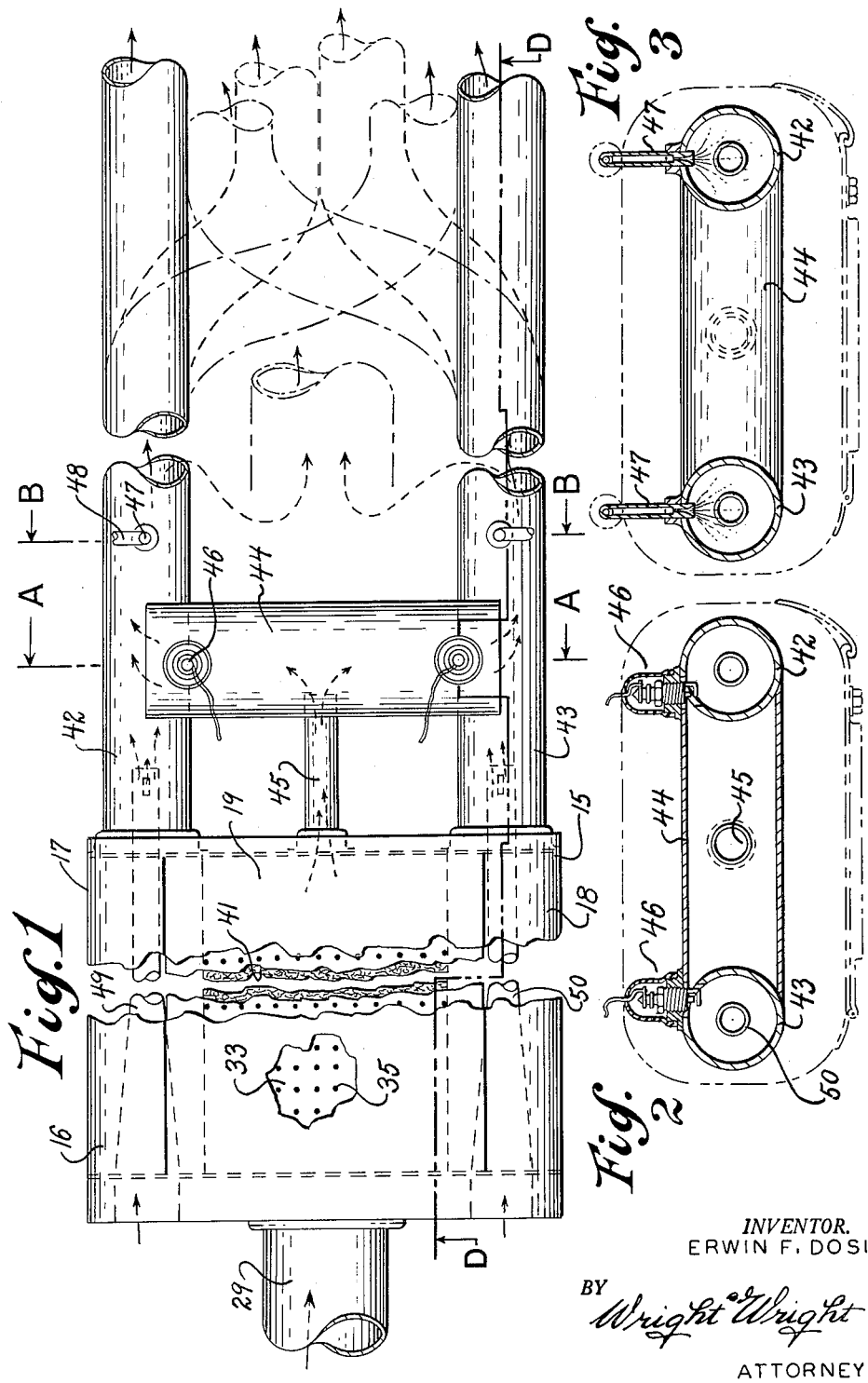

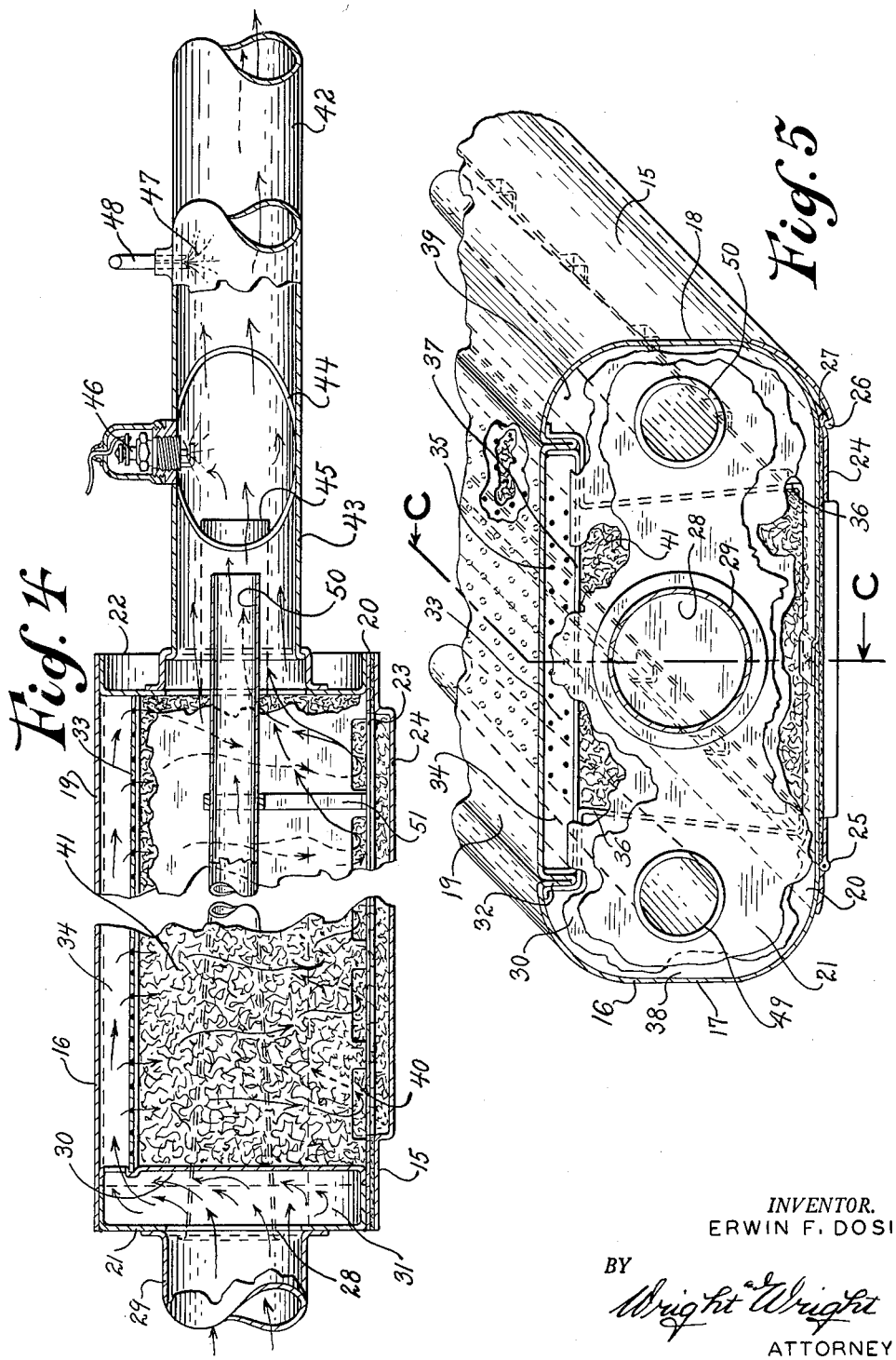

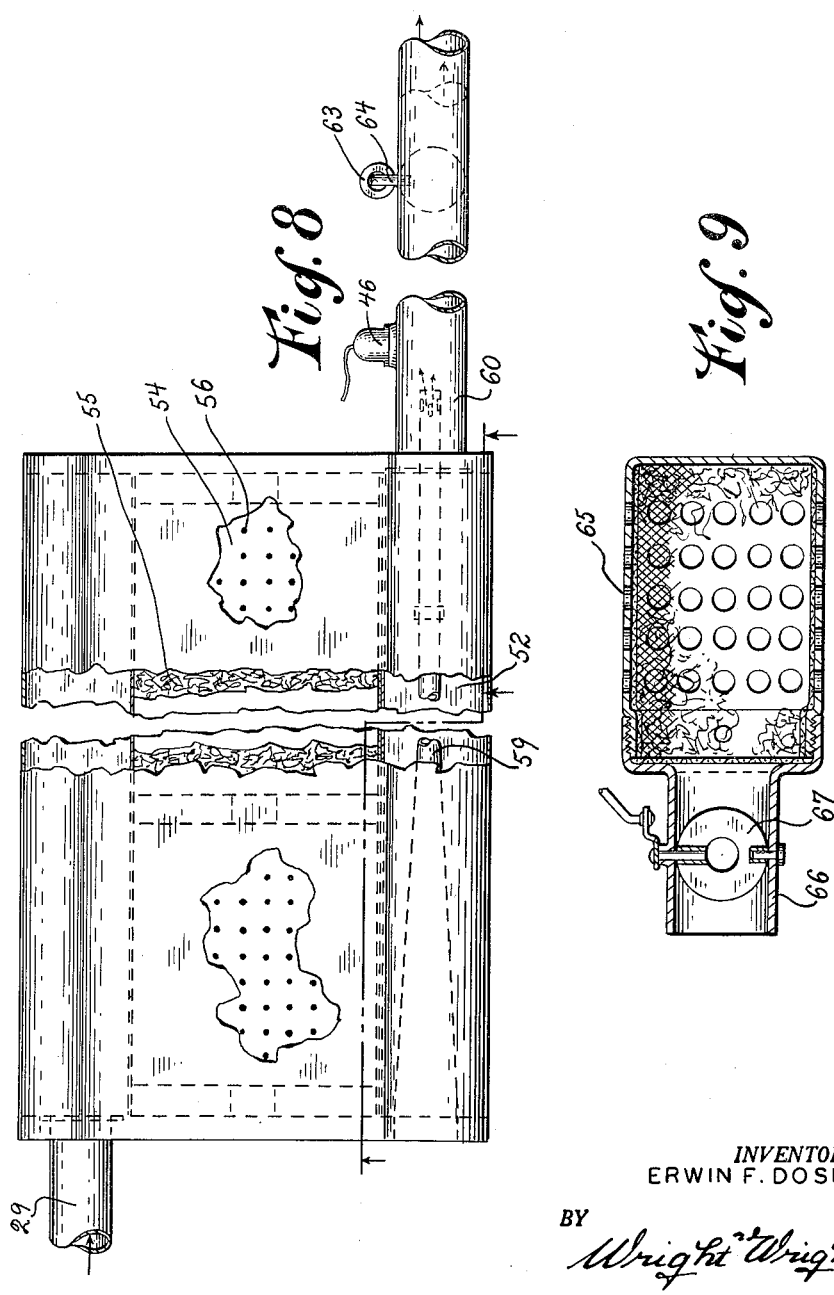

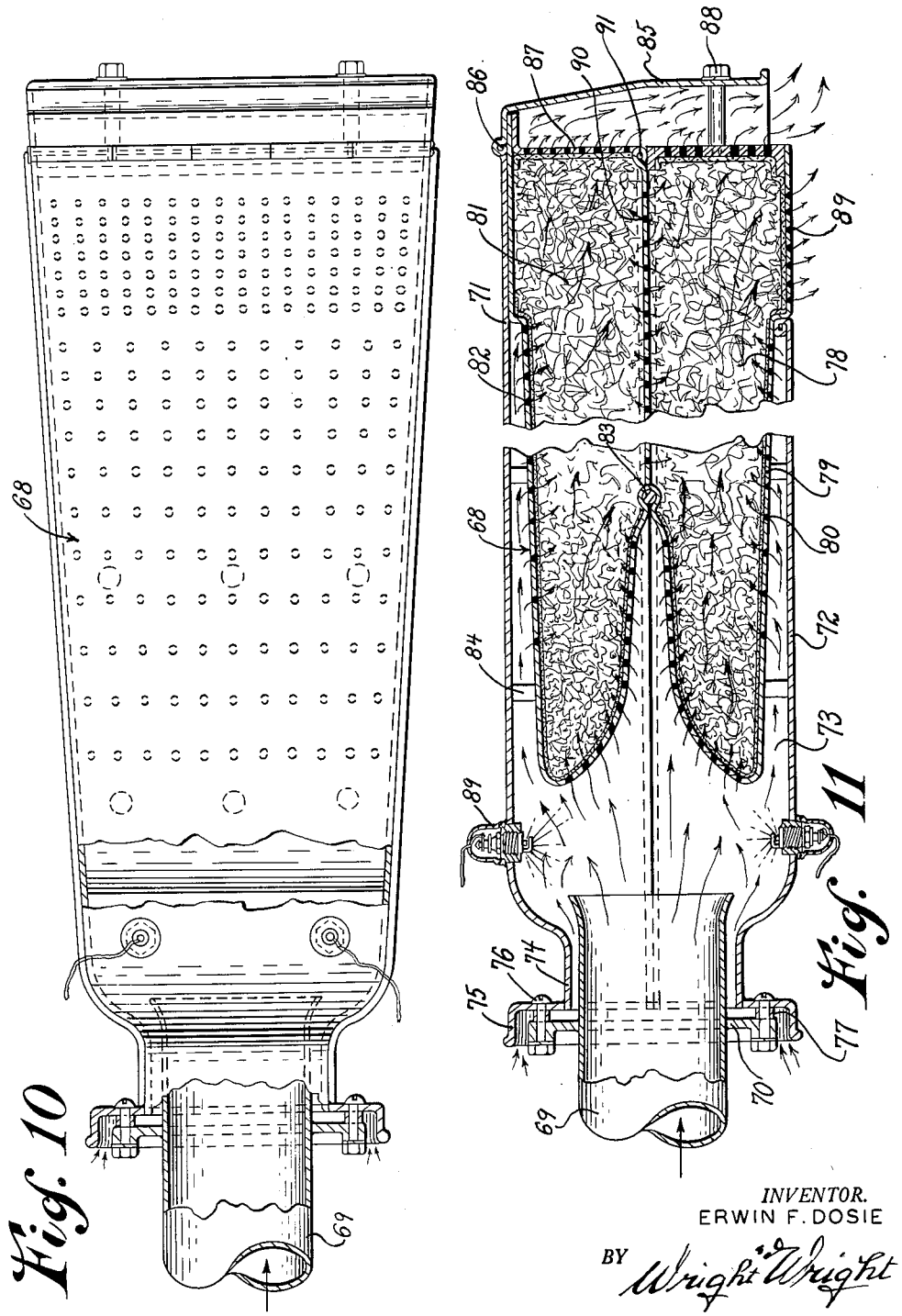

United States Patent Office 3,032,967
Patented May 8, 1962

3,032,967
EXHAUST FILTERING AND AFTER BURNER, CARBON AND ALKALI SLUDGE REMOVAL UNITS
Erwin F. Dosie, 2230 E. Bradford Ave., Milwaukee, Wis.
Filed Jan. 11, 1960, Ser. No. 1,654
3 Claims. (Cl. 60—30)

This invention appertains to the purification of gases and more specifically to a novel device especially useful for removing carbon and other objectionable matter from exhaust gases and particularly, exhaust gases from internal combustion engines or other motors utilizing hydrocarbon as fuel.

The contamination of the atmosphere by exhaust gases from internal combustion engines is a well recognized problem and much work has been done in effort to eliminate this nuisance. Some of the difficulties encountered have been, (1) the making of a unit capable of removing carbon from the exhaust of an engine of a size that can be associated with an automotive vehicle; (2) the making of such a unit at a cost which will be acceptable to the purchasing public; (3) making a unit which can be readily serviced by ordinary mechanics such as the attendants of gasoline filling stations, and (4) one which will not produce an objectionable back pressure on the engine.

It is, therefore, one of the primary objects of my invention to provide a carbon removal unit which will not only effectively accomplish its purpose, but which will be of a compact order for association with the exhaust pipe of a motor vehicle; one which will be economical to manufacture, one which will eliminate back pressure and one in which the filtering or carbon retention material can be easily removed when loaded for cleaning or replacement purposes.

Another salient object of my invention is the provision of a carbon removal unit embodying a main compartment or chamber for the reception of a fibrous carbon retention or filtering cartridge having communication therewith by means of a plurality of openings throughout its entire length a dispersing chamber into which the exhaust gases are initially received, the total area of the openings being greater than the cross-sectional area of the exhaust pipe or inlet opening, to insure the free flow of the gases into the main filtering compartment.

A further object of my invention is the provision of an out-flow chamber or chambers running the length of the main compartment for receiving the filtered gases from the main compartment, the main compartment having communication along its entire length with the out-flow chamber or chambers through slots or openings having a total area as great or greater than the area of the inlet for the exhaust, so as to insure the unimpeded exit of the gases from the main compartment.

Another further optional object of my invention is the provision of a fresh air intake pipe for the side out-flow chamber or chambers for partially cooling the gases prior to their final exit into the atmosphere and for directing warm air (the air in the pipe being warmed by the exhaust gases in the side chamber or chambers), into an expansion chamber, for commingling with any unburned fuel emanating from the main compartment, the means being provided in the expansion chamber for firing the unburned fuel and warm air, whereby to further purify the gases finally discharged from the unit.

A further salient optional object of my invention is to provide means for treating the gases just prior to the exit thereof into the atmosphere and in rear of the expansion chamber with a pulsating and intermittent water spray for cleaning said gases of any remaining solid particles or sludge.

A still further important optional object of my invention is the provision of a novel arrangement of chambers for effectively purifying exhaust gases from an internal combustion engine, which effectively function as a baffle for reducing objectionable noise and for eliminating the exit of gases into the air in sound producing waves or puffs.

A still further salient optional object of my invention is the provision of means for filtering the incoming fresh air into the unit and for controlling the amount of fresh air entering the unit according to the speed of the engine.

With these and other objects in view, the invention consists in the novel construction, arrangement and formation of parts, as will be hereinafter more specifically described and claimed and illustrated in the accompanying drawings, in which drawings, FIGURE 1 is a top plan view of one preferred type of my novel carbon removal unit, parts of the figure being shown broken away and in section to illustrate structural detail;

FIGURE 2 is a transverse sectional view taken on the line A—A of FIGURE 1, looking in the direction of the arrows, illustrating more particularly the expansion chamber and the spark plugs for firing unburned gases;

FIGURE 3 is a transverse sectional view through the unit taken on the line B—B of FIGURE 1, looking in the direction of the arrows, illustrating the means for supplying water sprays to the outlet pipes for treating the gases just prior to the exit thereof to the atmosphere;

FIGURE 4 is a longitudinal sectional view through my improved unit taken on the line D—D of FIGURE 1, looking in the direction of the arrows;

FIGURE 5 is a fragmentary transverse sectional view partly in perspective illustrating the dispersing chamber, the main filtering chamber or compartment and the side out-flow compartments;

FIGURE 6 is a fragmentary longitudinal sectional view through a modified form of the unit, the unit being of the type having a single out-flow chamber;

FIGURE 7 is a transverse sectional view partly in perspective of that form of the invention shown in FIGURE 6;

FIGURE 8 is a side elevational view of a further modified form of my unit, the unit being of the so-called upright type, the figure being partly broken away and in section;

FIGURE 9 is an enlarged longitudinal sectional view showing means for filtering incoming fresh air to the unit and for controlling the amount of said fresh air to the unit;

FIGURE 10 is a top plan view of a still further form of my invention, the unit shown being of a type particularly adapted for connection with the exhaust pipes of existing automotive vehicles, parts of the view being shown broken away and in section, and FIGURE 11 is a longitudinal view through the unit shown in FIGURE 10.

Referring to the drawings in detail, wherein similar reference characters designate corresponding parts throughout the several views, the numeral 15 generally indicates my novel carbon removal unit for exhaust gases and the like, and the same embodies a casing 16 of a generally elongated flat shape. As shown in FIGURES 1 to 7, inclusive, the same is preferably, but not necessarily, positioned in a horizontal plane. The casing can be formed from any desirable materials, but preferably of sheet metal of a non-corrosive type. As illustrated in FIGURES 1 to 5, inclusive, the casing 16 includes arcuate side walls 17 and 18, a top wall 19, a bottom wall 20, and end walls 21 and 22. The bottom wall 20 is provided with an enlarged opening 23 normally closed by a cover plate 24. This cover plate 24 can be hingedly connected, as at 25, along one longitudinal edge to the bottom wall 20. The cover plate can be held in its closed position by a spring plate 26 and the opposite edge of the cover plate from its hinge 25 can be rolled, as at 27, for snapping over the plate 26. This cover plate 24 gives access to the interior of the casing, for a purpose, which will be later set forth. The end wall 21 is provided with an exhaust gas entrance opening 28, and this opening has communicating therewith a pipe 29 leading from the source of the exhaust gases, such as an internal combustion engine and this pipe 29 can be welded or otherwise secured to the outer face of the end wall 21.

Extending transversely of the casing 16 is a partition plate 30 and this plate is arranged adjacent to, but in spaced relation to the end wall 21, and the plate can be rigidly fastened to the top, bottom and side walls of the casing and this partition wall 30 in conjunction with the end wall 21 and other walls of the casing forms a front entrance compartment 31 for the gases. It is to be noted that as the gases enter the casing and into the compartment 31, the same strike the partition plate 30 and the partition plate functions as a baffle. The top wall 19 has struck down from the same spaced parallel longitudinally extending ribs 32 and these ribs constitute strengthening means for the casing and means for supporting certain partitions, as will now be set forth. Secured to the ribs 32 is a horizontally disposed partition plate 33 and this partition plate 33 extends from the transverse partition plate 30 to the end wall 22 and defines in conjunction with the top wall 19 a dispersing compartment 34, and by referring to FIGURE 4, it can be seen that the dispersing compartment 34 communicates with the front compartment 31. The horizontal partition wall 33 is provided throughout its entire length with a plurality of slots or openings 35, for a purpose, which will also appear. Also rigidly secured to the ribs 32 are depending longitudinally extending spaced partition walls 36 and these walls are arranged in spaced relation to the side walls 17 and 18 of the casing and extend downward from the horizontal partition plate 33 to the bottom wall 20. The longitudinally extending partition walls 36 in conjunction with the horizontal partition wall 33 and the bottom wall 20 define a centrally disposed main compartment 37. It is to be also noted that the longitudinal partition walls 36 extend from the transverse partition wall 30 to the end wall 22 and these longitudinal partition walls 36 are disposed on each side of the opening 23, so that when the cover plate 24 is swung downward access can be had to this main compartment. The longitudinal partition plates 36 in conjunction with the side walls 17 and 18 also define longitudinally extending side out-flow chambers 38 and 39, and these chambers extend from the transverse partition plate 30 to the end wall 22. The main chamber 37 has communication with the out-flow chambers 38 and 39 adjacent to its lower end by means of slots 40. At this time, it is to be noted that the entire area of the openings 35 in the partition or dispersing plate 33 have a combined greater area than the inlet opening 28 and that the slots 40 have a combined area greater than the inlet opening 28. Thus, this provides means for the unimpeded flow of gases from the dispersing chamber 34 into the main compartment 37 and from the main compartment 37 into the out-flow compartments 38.

The main compartment 37 is packed with a desired type of fibrous material 41 best suited for the filtering of gases and the retention of carbon and other obnoxious matter found in exhaust gases. This fibrous material may be fibre glass, or other like substance, which will not only filter the gases and retain any solid particles, but will also effectively withstand the heat of exhaust gases. This fibrous material may be in the nature of a cartridge and can be enclosed in a light screen material and this cartridge can be removed from the main compartment through the enlarged opening 23. Hence, the fibrous material is freely removable for cleaning or replacing by a new cartridge and it now can be seen that the main compartment constitutes the principal filtering area.

Communicating with the rear ends of the air flow chambers 38 and 39 are exit or exhaust pipes 42 and 43. The exhaust pipes are connected by a cross-pipe 44, which constitutes an expansion and combustion chamber, as will later appear. It can be seen, however, that flow is permitted between the cross-pipe 44 and exhaust pipes 42 and 43. Leading directly to the cross-pipe 44, preferably at the center thereof, is a flattened exit tube 45, and this tube has communication with the main filtering chamber 37. Thus, gases can flow from the main filtering chamber directly to the cross-pipe 44. Extending into the cross-pipe 44 adjacent to the exhaust pipes 42 and 43, are spark plugs 46 and these plugs can be intermittently fired through any suitable means (not shown). The purpose of these spark plugs will also later appear.

Rearwardly of the cross-pipes 44 and disposed directly in the pipes 42 and 43 are water spray nozzles 47. These nozzles have communicating therewith water feed pipes 48 which can lead from any suitable source of supply and means can also be provided for insuring the proper atomizing and spraying of a controlled amount of water into these pipes. The purpose of the water sprays, will now also appear.

In operation of my unit, the exhaust gases enter into the casing 16 through the inlet opening 28 and impinge against the transverse partition 30 and the chamber 31 permits the gases to expand within certain limits and the gases then flow into the dispersing chamber 34. As the openings 35 extend throughout the length of the dispersing chamber, these gases will flow into the main filtering compartment throughout the entire length thereof and completely permeate the filtering material 41. The gases will flow through the filtering material and through the slots 40 at the lower edges of the main compartment into the side air flow chambers 38 and 39, and thence into the exhaust pipes 42 and 43 and eventually into the atmosphere. However, the gases are preferably further treated, as will also now appear.

Extending through the air flow chambers 38 and 39 are air flow pipes 49 and 50. These pipes open out through the end wall 21 and take in fresh air at this point. The air flow pipes 49 and 50 extend entirely through the air flow chambers 38 and 39, and into the exhaust pipes 42 and 43 just short of the cross-pipe 44. If desired, the air flow pipes 49 and 50 can be slightly restricted toward their exit ends. In other words, these air flow pipes can be tapered. While the air flow pipes are supported by the end wall 21, I can provide additional supports therefor, such as brackets 51, best shown in FIGURE 4. As fresh air flows through the air flow pipes 49 and 50, a heat transfer takes place, and the exhaust gases are reduced in temperature and the air in the pipes 49 and 50, in turn becomes heated. The heated air flows into the exhaust pipes 42 and 43 and into the cross-pipe 44. Any unburned gases flowing into the cross-pipe 44 from the central pipe 45 and exhaust pipes 42 and 43 commingling with the fresh warm air will be fired by the plugs 46. This insures the further purification of the gases. As the gases continue their flow through the pipes 42 and 43, the same are treated by the liquid sprays 47 and the sprays function to further treat the exhaust gases and precipitate any remaining carbon and alkali sludge. It can be seen that the cross-pipe 44 with the spark plugs 46 consititute an after burner for the exhaust gases.

If desired, the cover plate can be in the form of a pan (as also best shown in FIGURE 4) for collecting any precipitated carbon and the like, and if desired, this pan can also be packed with a fibrous filtering material.

As suggested in FIGURE 1 in dotted lines, the exhaust pipes 42 and 43 can be arranged in different manners and can merge into a single outlet pipe.

In FIGURES 1 to 5, inclusive, I have shown dual air flow chambers 38 and 39; however, as shown in FIG- URES 6 and 7, a single out-flow chamber 52 can be provided on one side only of the unit. In this instance, I eliminate the initial front expansion chamber 31 and utilize in lieu thereof a side expansion chamber 53. This chamber 53 is located on the opposite side of the unit from the out-flow chamber 52. The chamber 53 has communication with a top dispersing chamber 54 and this chamber corresponds identically with the dispersing chamber 34, shown in FIGURES 1 to 5, inclusive. Thus, this chamber 54 has communication with a main filtering chamber 55 through the medium of a plurality of openings 56. The main filtering chamber 55 is also packed with the desired type of filtering material. The main filtering chamber 55 has communication with the out-flow chamber 52 throughout its entire length by a plurality of slots or openings 57 formed in the division wall between the main compartment and out-flow chamber 52. In this view, the wire screening indicated by the reference character 58 for the fibrous material is shown. The out-flow chamber 52 is also provided with an air flow pipe 59. The outer end of the chamber 52 has communicating therewith an exhaust pipe 60, and the exhaust pipe may terminate in a double discharge 61 by the employance of a T-coupling 62. This T-coupling can constitute a firing chamber and a sludge removal chamber by means of a water spray and in FIGURE 6, I have illustrated a solenoid 63 having a plunger 64 for intermittently actuating the spray or atomizer.

In FIGURES 1 to 7, inclusive, I have shown the unit arranged in a horizontal plane and as stated, the same can be arranged in a vertical plane and this I have shown in FIGURE 8. The device shown in FIGURE 8 can be the same as shown in FIGURES 6 and 7, and merely turned on its side.

It may be desirable to filter the incoming fresh air and hence in FIGURE 9, I have shown an attachment for accomplishing this purpose. The attachment includes a perforated filtering head 65 carrying an entrance neck 66. This neck can be coupled with the air flow pipes shown in FIGURES 1 to 8, inclusive. Also shown in FIGURE 9 is a butterfly valve 67. It may be desirable to control the amount of fresh air and the butterfly valve 64 can be used for this purpose. The butterfly valve can be operated from the throttle valve of the internal combustion engine through a suitable linkage (not shown). Thus as the speed of the engine increases the butterfly valve can be opened wider and as the speed of the engine decreases the butterfly valve can be moved toward a closed position.

In FIGURES 10 and 11 I have shown a unit, now indicated by the reference character 68 for use on existing automobiles, and the unit 68 is so-arranged as to be connected directly with the automobile engine exhaust pipe 69. The unit 68 can be coupled with a pipe 69 either having a muffler or not. To permit the connection of the unit 68 with the pipe 69, I weld to the pipe 69 a supporting plate 70. In actual practice, the supporting plate 70 can come in various sizes so as to fit various sizes of exhaust pipes and the unit 68 is carried directly by the plate 70 as will now appear.

The unit 68 includes relatively flat top and bottom walls 71 and 72, and side walls 73. The entrance end of the unit terminates in an entrance neck 74 into which the exhaust pipe 69 is adapted to protrude and this neck 74 carries an entrance bell 75 which surrounds the plate 70. The bell 75 is connected to the plate 70 by bolts 76 and is spaced from the plate by spacers 77. The space between the bell 75 and plate 70 constitutes a fresh air inlet.

Arranged within the casing of the unit is a main filtering compartment 78 and this compartment is formed by partitions 79 welded or otherwise secured to the top and bottom walls 71 and 72. It is to be noted that the forward ends of the partitions 79 are spaced from the top and bottom walls and these portions of the partitions are perforated or provided with openings 80. Thus, the incoming gases and fresh air can flow into the main filtering compartment 78 through the openings 80. The compartment 78 is packed with a fibrous material 81 of a character heretofore set forth. It is also preferred to have the filtering material, at least partially enclosed within a woven wire screen mesh 82. If desired, the meeting points of the partition 68 can be supported by a transversely extending rod 83 carried by the side walls 73 of the unit. The partition walls can also be supported at spaced points from the top and bottom walls by brackets 84. The rear end of the main filtering compartment 78 opens out through the rear end of the casing and the rear end of the casing is covered by a hood 85, hinged as at 86, to top wall 71 of the casing. The lower end of the hood is open to the atmosphere and functions to defer the gases in a downward direction. By raising the hood, access can be had to the main filtering compartment for the removal of the fibrous filtering material when the same becomes loaded with carbon and the like. If desired, the rear end of the casing can also be closed by a perforated plate 87 frictionally fitted within the casing and this perforated plate can be united with the hood 85 by suitable bolts and nuts 88. The bottom wall 72 of the unit adjacent to its extreme rear end can also be provided with exit openings 89 and hence a certain part of the gases is also discharged from the bottom of the device.

In this form of the invention, the incoming exhaust gases and fresh air enter into the front end of the casing and flow along the sides of the filtering chamber and then into the main filtering chamber. The spaces along the sides of the filtering chamber constitutes air flow chambers which correspond somewhat to the side air flow chambers 38 and 39 of the unit, shown in FIGURES 1 to 5, inclusive.

The top and bottom walls 71 and 72 of the unit can carry spark plugs 89 which extend into the front end of the casing and these spark plugs can be intermittently fired in any desired manner. Thus, means is provided in this form of my unit for also firing unburned fuel.

If desired, the main filtering compartment 78 can be divided by a perforated centrally disposed partition plate 90. This partition plate at its outer end is rockably mounted on a hinge pin 91 carried by the side walls 73 of the unit. By having the division plate 90 pivoted, the same can be swung to one side or the other and this will facilitate the replacement of the filtering material.

From the foregoing description, it can be seen that I have provided a simple but highly efficient means for removing carbon, alkali and other obnoxious matter from the exhaust gases of an internal combustion engine. I lay stress on the means provided for permitting the entrance of fresh air into the unit, in that, not only does the fresh air facilitate the supporting of combustion for unburned gases but also tends to reduce the temperature of the exhaust gases. While I provide expansion chambers for the exhaust gases, in actual practice, the air cools the exhaust gases to reduce the volume of such gases, i.e., the expanding nature of the gases, and my chambers form means for dissipating these gases over a large area to permit the flow thereof into the main filtering compartment.

Various changes in details may be made without departing from the spirit or the scope of this invention, but what I claim as new is:

1. A device for association with the exhaust pipe of an internal combustion engine for removing carbon and other obnoxious matter from said exhaust gases prior to the entrance of said gases into the atmosphere comprising a main casing having spaced partitions therein dividing said casing into a main central filtering compartment, a dispersing chamber extending the full length of the main filtering compartment and having communication therewith throughout its entire length by a plurality of openings and an initial exhaust receiving compartment having communication with the dispersing chamber, said initial exhaust receiving compartment having communication with an exhaust pipe through an inlet opening, the casing also having on opposite sides of the main filtering compartment longitudinally extending out-flow chambers, a filtering material packed in said main filtering compartment, said out-flow chambers and the main filtering compartment having communication adjacent their lower ends by slots, exhaust pipes extending outward from the casing having communication with the out-flow chambers for receiving the filtered exhaust gases therefrom and fresh air conducting pipes extending through the out-flow chambers and terminating in said exhaust pipes, the fresh air conducting pipes opening out through the front of the casing, the fresh air flowing through said last mentioned pipes commingling with the gases in the exhaust pipes for cooling and aerating the exhaust gases in the exhaust pipes.

2. A device for association with the exhaust pipes of an internal combustion engine for removing carbon and other obnoxious matter from said exhaust gases prior to the entrance of said gases into the atmosphere, as defined in claim 1, and said exhaust pipes being connected beyond the fresh air inlet pipes by a cross pipe and said cross pipe constituting a combustion and aerating chamber, and a spark plug in said cross pipe for firing any unburned gases.

3. A device for association with the exhaust pipes of an internal combustion engine for removing carbon and other obnoxious matter from said exhaust gases prior to the entrance of said gases into the atmosphere as defined in claim 2, and said cross pipe also having direct communication with the filtering compartment.

References Cited in the file of this patent
UNITED STATES PATENTS

| | | |
|---|---|---|
| 1,415,418 | Wachtel | May 9, 1922 |
| 1,522,111 | Franck-Philipson | Jan. 6, 1925 |
| 1,716,481 | Bilsky | June 11, 1929 |
| 1,843,999 | White | Feb. 9, 1932 |
| 1,867,325 | Neville | July 12, 1932 |
| 2,004,865 | Grison | June 11, 1935 |
| 2,702,452 | Taylor | Feb. 22, 1952 |
| 2,763,982 | Dega | Sept. 25, 1956 |
| 2,795,103 | Jenison | June 11, 1957 |
| 2,806,346 | Clayton | Sept. 17, 1957 |
| 2,932,157 | Villasenor | Apr. 12, 1960 |

FOREIGN PATENTS

| | | |
|---|---|---|
| 436,331 | Great Britain | Oct. 9, 1935 |